United States Patent [19]
Wiese et al.

[11] Patent Number: 5,343,040
[45] Date of Patent: Aug. 30, 1994

[54] THERMAL REFERENCE TECHNIQUE FOR FLIR SENSORS

[75] Inventors: Gary E. Wiese, Orlando; J. Donald Lee, Longwood; G. Edward Newberg, Winter Springs, all of Fla.

[73] Assignee: Martin Marietta Corporation, Bethesda, Md.

[21] Appl. No.: 74,656

[22] Filed: Jun. 10, 1993

[51] Int. Cl.$^5$ .............................................. G01D 18/00
[52] U.S. Cl. ................................. 250/252.1; 250/334
[58] Field of Search ....................... 250/252.1 A, 334

[56] References Cited

U.S. PATENT DOCUMENTS

| | | | |
|---|---|---|---|
| 3,895,182 | 7/1975 | Trilling | 178/6.8 |
| 3,977,893 | 8/3119 | 76trotta | 356/218 |
| 4,419,692 | 12/1983 | Modisette et al. | 358/113 |
| 4,482,252 | 11/1984 | Lorenz | 356/448 |
| 4,707,736 | 11/1987 | de Virel | 358/113 |
| 4,876,453 | 10/1989 | Wirick | 250/332 |
| 4,939,480 | 7/1990 | Frye et al. | 330/260 |
| 4,948,964 | 8/1990 | Gohlke | 250/350 |
| 4,983,837 | 1/1991 | Cooper et al. | 250/334 |
| 5,140,147 | 8/1992 | Barnett | 250/208.1 |

FOREIGN PATENT DOCUMENTS 59-34125  2/1984  Japan .................. 250/334

OTHER PUBLICATIONS

T. G. Longshaw, "An advance airborne thermal infrared linescanner." *The Transactions of the SA Institute of Electrical Engineers (Mar. 1976) pp. 86-92.*

Primary Examiner—Constantine Hannaher
Attorney, Agent, or Firm—Burns, Doane, Swecker & Mathis

[57] ABSTRACT

In a forward looking infrared (FLIR) sensor, a scanning mirror views an external scene, and the infrared energy from the scanning mirror is directed along an optical path to a solid state detector. In the optical path there is a three-position mirror which is driven by an actuator to three predetermined positions. The FLIR sensor also includes two thermal reference sources which are disposed on either side of the optical path and viewable by the three-position mirror. When in a neutral position the three-position mirror reflects the infrared energy from the external scene onto the detector. When the three-position mirror is moved away from the neutral position to two different predetermined positions, the three-position mirror views each of the thermal reference sources and reflects the thermal energy of the thermal reference sources onto the detector in order to provide two reference irradiance levels for the FLIR sensor.

8 Claims, 4 Drawing Sheets

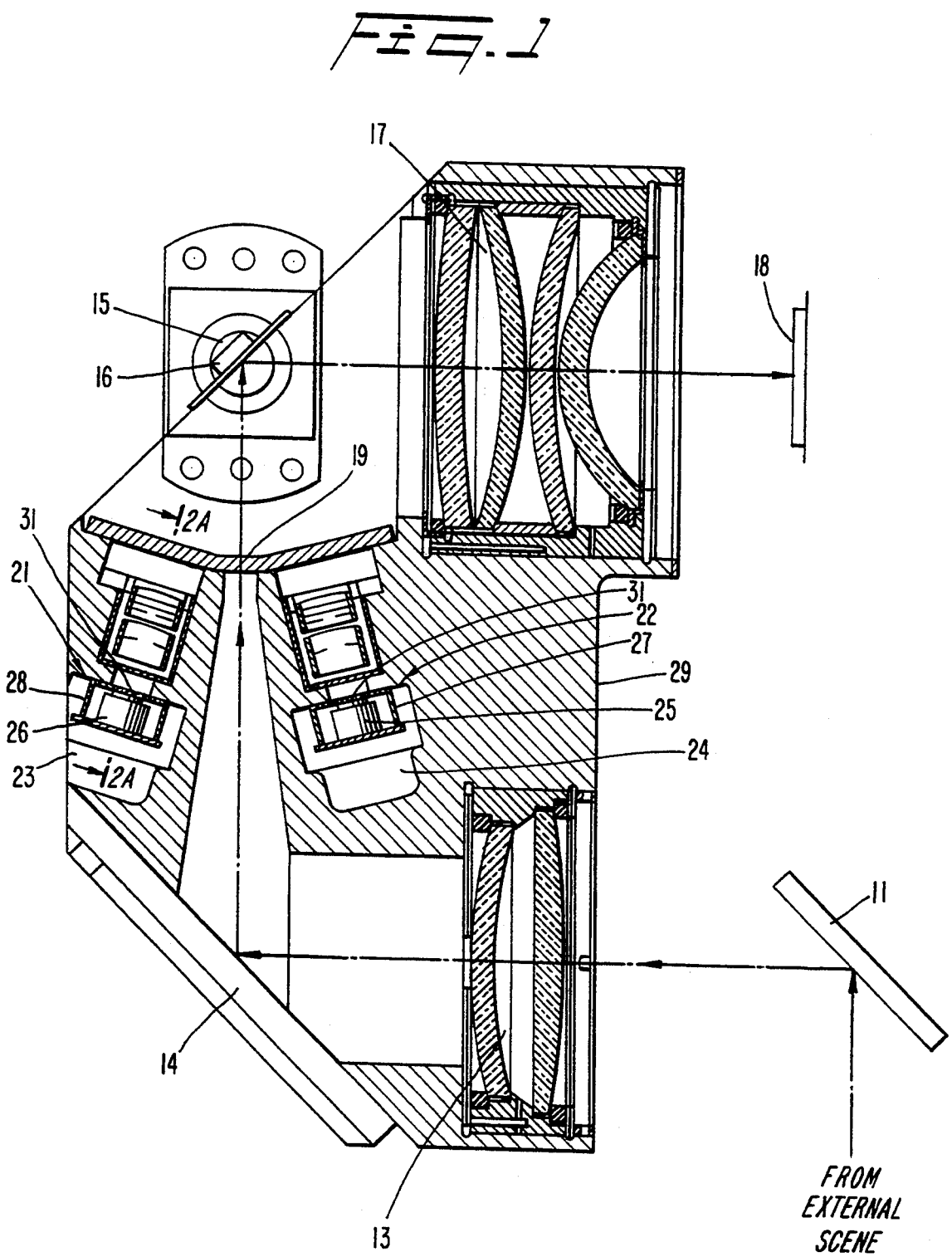

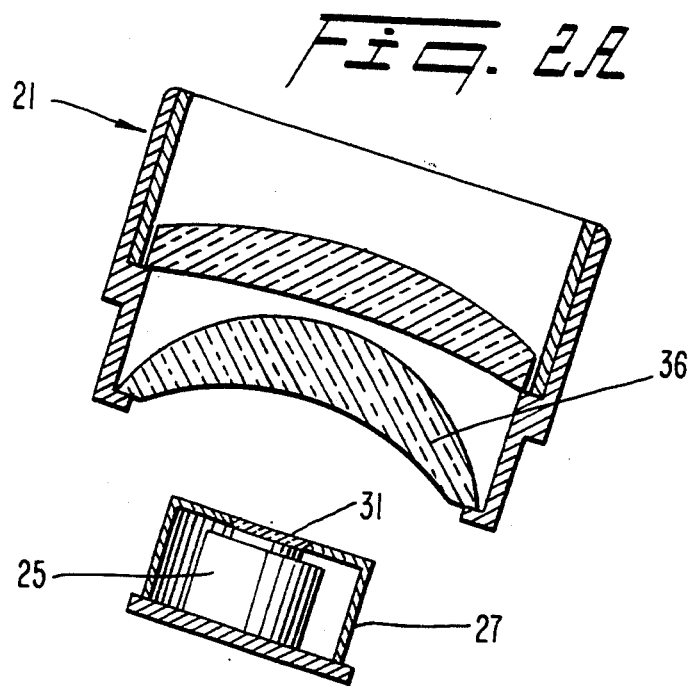
Fig. 2A
Fig. 2B
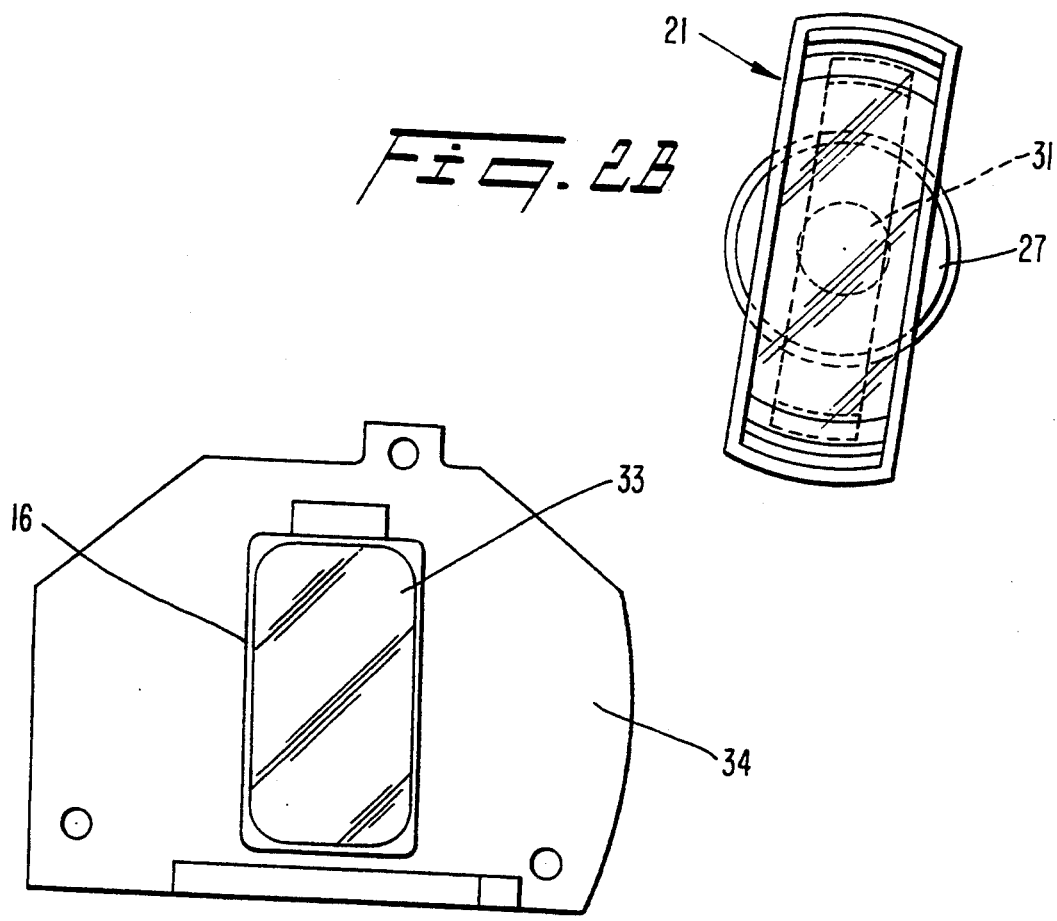
Fig. 3A

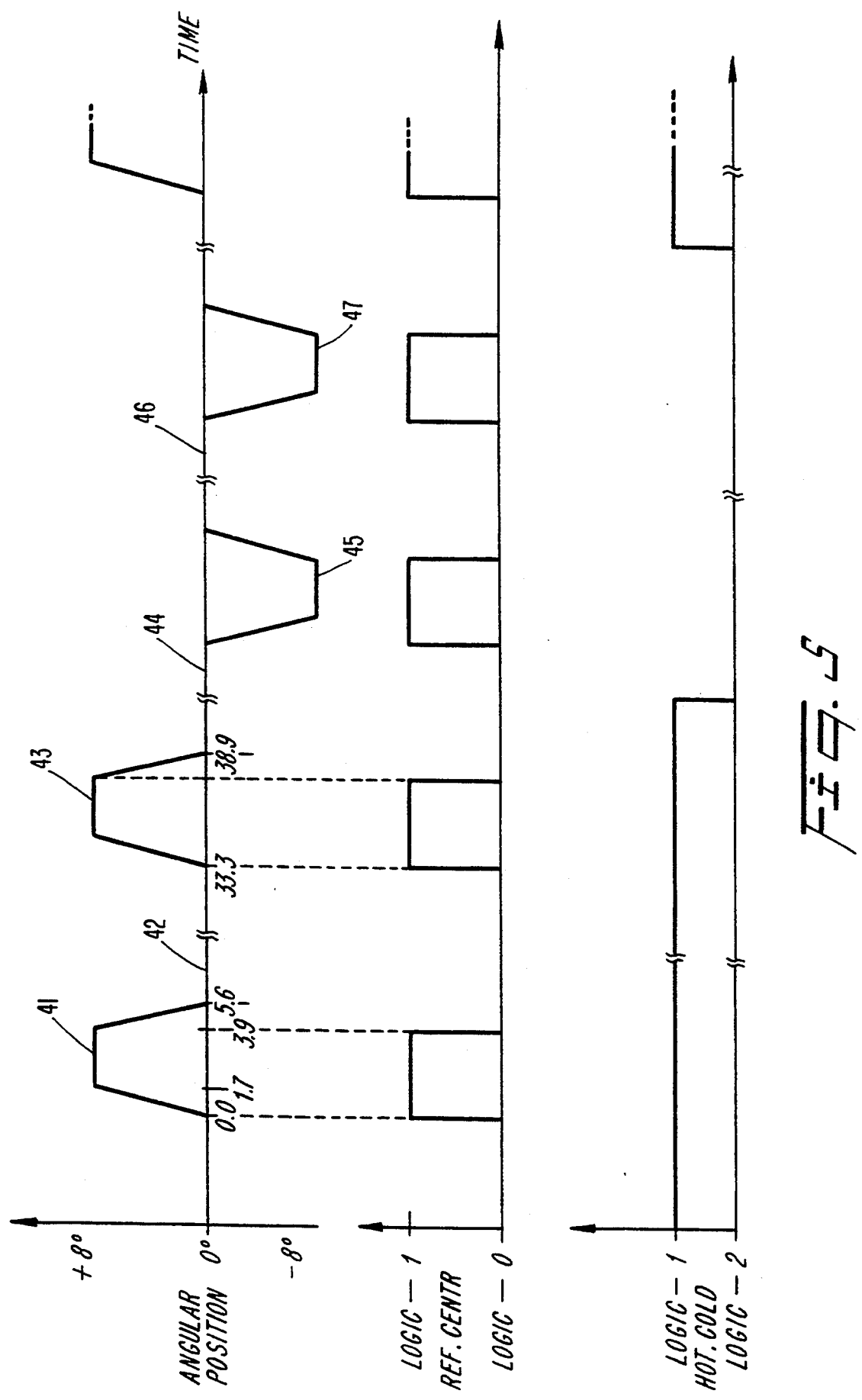

THERMAL REFERENCE TECHNIQUE FOR FLIR SENSORS

FIELD OF THE INVENTION

The present invention relates to improved forward looking infrared (FLIR) sensor, and more particularly, it relates to a method for apparatus for thermal referencing a FLIR sensor.

BACKGROUND OF THE INVENTION

Forward looking infrared (FLIR) sensors are infrared imaging devices that utilize a scanning mirror for scanning the infrared energy from an external scene onto an infrared detector. Typically, the scanning mirror is a rotatable mirror disposed in a housing, and the detector is a solid state device such as a solid state detector array. The output of the detector is an electronic signal suitable for display on a CRT or other output device.

A problem which is often encountered in FLIR sensors is that each element or pixel of the detector has a different sensitivity to infrared energy. The same amount of infrared energy may cause different elements of the detector to produce different output levels. Accordingly, there is a need to provide a reference for the detector in order to normalize the outputs of the individual elements of the detector.

One prior art technique for referencing a FLIR sensor included thermal references which were disposed at a roll-stabilized focal plane within the afocal optics. The thermal references were then imaged directly onto the detector. The disadvantages of this prior art technique are that direct illumination requires extremely tight source temperature uniformity, a requirement for a stabilized focal plane, and overscan of the field of view.

Another prior art technique for referencing FLIR sensors is described in U.S. Pat. No. 4,948,964, entitled "Artificial Target for Automatic Gain Normalization". The device described in U.S. Pat. No. 4,948,964 includes a servo controlled chopper mirror that views a single thermal reference. The chopper mirror has two different reflectivites, and therefore is capable of providing two different effective reference temperatures. The relationship between the two reference temperatures is fixed, because the relationship is dictated by the structure of the chopper mirror. The chopper mirror also has a relatively large moment of inertia due to the increased size necessary to accommodate the two different reflective surfaces. Since the plane of the chopper mirror is substantially perpendicular to the axis of rotation of the servomotor, the mirror assembly is a relatively bulky device which cannot be easily retrofitted into an existing sensor.

Accordingly, there is a need for a substantially more compact and less bulky thermal reference system which is suitable for being retrofit into existing sensors. Such an improved thermal referencing system must easily fit within the optical path of an existing sensor. Moreover, the relationship between reference temperatures should be easily modified without redesigning the structure of the mirror.

SUMMARY OF THE INVENTION

The present invention relates to a method and apparatus for the thermal referencing of a FLIR sensor. The improved FLIR sensor includes a first moveable mirror which scans infrared energy from an external scene. The infrared energy is transmitted through a field stop via a fold mirror and a first focusing device. The infrared energy is directed along an optical path towards a second moveable mirror which reflects the infrared energy to a second focusing device. The second focusing device focuses the infrared energy onto a solid state detector array. The second moveable mirror is mounted on a rotatable shaft which is coupled to an actuator.

A pair of thermal reference sources are disposed between the second moveable mirror and the fold mirror on either side of the optical path. The movement of the second moveable mirror is synchronized to the scanning movement of the first moveable mirror, and the second moveable mirror is capable of viewing the first thermal reference source, the second thermal reference source, or the external scene in a predetermined order. The thermal energy from the thermal references is directed to the detector, and the two thermal reference sources establish two reference irradiation levels for the FLIR sensor.

BRIEF DESCRIPTION OF THE DRAWINGS

FIG. 1 is a top view of the FLIR sensor of the present invention with a portion of the housing removed;

FIG. 2A is a cross-sectional view of a thermal reference source of FIG. 1 and associated optics taken along the line A—A;

FIG. 2B is a plan view of a thermal reference source of FIG. 1 and associated optics;

FIG. 3A is a plan view of the second moveable mirror;

FIG. 5 is a timing diagram associated with the operation of the second moveable mirror.

DETAILED DESCRIPTION OF THE INVENTION

Figure 3B:
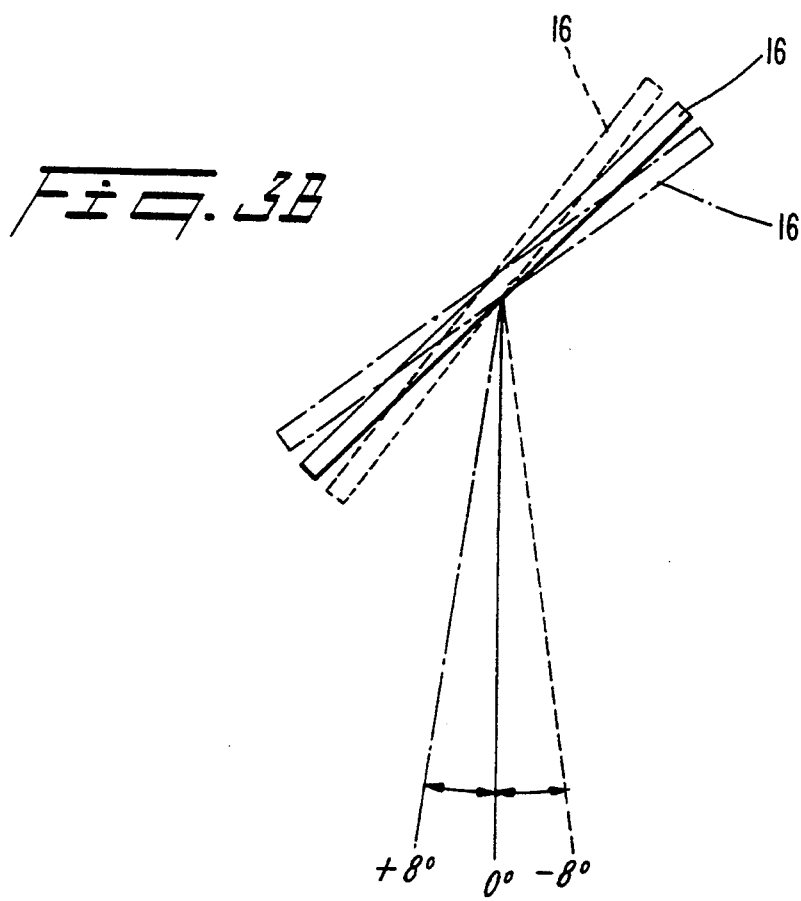
FIG. 3B is a top view of the three predetermined positions of the second moveable mirror.

Referring now to FIG. 1, a top view of a FLIR sensor with a portion of its housing 29 removed is illustrated. The FLIR sensor includes afocal optics having a first moveable mirror or scanning mirror 11 which scans the infrared energy from an external scene. The first movable mirror or scanning mirror 11 redirects the infrared energy into a first focusing device having a lens 13. The focused infrared energy is directed onto a fold mirror 14 which reflects the infrared energy through a field stop 19 onto a second moveable mirror or three-position mirror 16 which is rotated by a galvanometer type actuator 15. The three-position scan mirror 16 directs the infrared energy into a second focusing device having a lens 17. The lens 17 focuses the infrared energy onto a detector 18 which is preferably a solid state device, such as a solid state detector array.

Disposed on either side of the optical path between the fold mirror 14 and three-position mirror 16, are two thermal reference sources 21, 22. The thermal reference sources 21, 22 are supported on heat sinks 23, 24 which are attached to the housing 29 of the FLIR sensor.

Referring now also to FIGS. 2A and 2B, cross-sectional views of the thermal reference source 21 taken along lines A—A and B—B are provided. The thermal reference sources 21, 22 are preferably thermo-electric modules 25, 26 which are coated to have an emissivity of 0.95 or greater. The thermo-electric modules 25, 26 are sealed in evacuated cans 27, 28 having a light transmissive window 31. The thermal reference sources 21, 22 generate thermal energy having predetermined temperatures T1 and T2. The temperatures T1 and T2 preferably have values variable between −33° C. and +57° C. Light from the thermo-electric modules is focused by the lens assembly 36.

Referring now to FIG. 3A, a plan view of the three-position mirror 16 is provided. The three-position mirror 16 has a nominally rectangular mirror surface 33. It is surrounded by a co-planar mounting bracket 34, by means of which the actuator 15 and three-position mirror 16 are attached to the FLIR sensor housing. The mounting bracket 34 is integral with the housing for the actuator 15 which causes the three-position mirror 16 to rotate to three predetermined positions.

The three predetermined positions of the mirror 16 are illustrated in FIG. 3B. FIG. 3B provides a side view of the mirror 16 in each of its three predetermined positions. In the neutral or 0° position, the mirror 16 is disposed such that it views the field stop 19 and the infrared energy from the external scene. The infrared energy is reflected off the mirror 16 and directed towards the detector 18. When the mirror 16 is rotated to the first predetermined position of +8° from the neutral position, thermal energy emitted from the thermal reference source 21 is directed towards the mirror 16 and reflected toward the detector 18. When the mirror 16 is rotated to the second predetermined position of −8° from the neutral position, the thermal energy of the thermal reference source 22 is directed toward the mirror 16 and reflected toward the detector 18.

Figure 4:
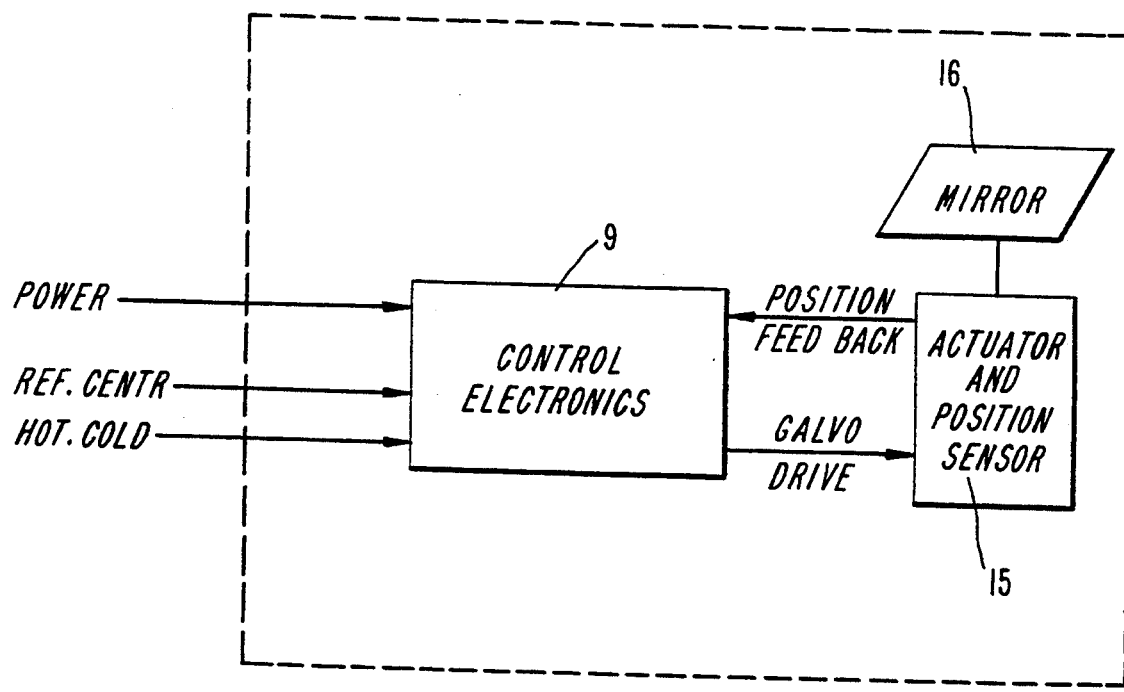
FIG. 4 is a block diagram of the electronics associated with the second moveable mirror.

Referring now to FIG. 4, there is a schematic block diagram of the servosystem for positioning the three-position mirror 16. The servosystem includes control electronics 9, the actuator 15 and its associated position sensor. The electrical inputs to the control electronics 9 include a source of power designated POWER and two digital control signals. The first digital control signal REF.CENTR is capable of commanding the mirror to one of the thermal reference positions (either +8° or −8°) or to the predetermined center or neutral position of 0°. The digital control signal HOT.COLD selects which of the two predetermined positions (+8° or −8°) the three-position mirror 16 will view when commanded by REF.CENTER. The control electronics 9 generate a GALVO DRIVE signal which causes the actuator 15 to rotate to the desired predetermined position. As the actuator 15 assumes its commanded position, the associated position sensor detects the position of the actuator 15 and generates a POSITION FEEDBACK signal which is fed back to the control electronics 9.

Referring now to FIG. 5, a timing diagram illustrates the angular position of the three-position mirror 16 at predetermined time intervals. FIG. 5 also depicts the logic levels of the digital control signal REF.CENTR and the digital control signal HOT.COLD that are used to command the three-position minor to either the neutral, +8°, or −8° positions. During the active portion of the scan cycle of the scan minor 10, while the three-position mirror 16 is held in the fixed neutral position of 0°, the image of the external scene is transmitted through the field stop 19 and then reimaged on the detector 18.

During the inactive portion of the scan cycle of the scanning minor 10 (approximately 6.7 msec.), the three-position minor 16 is tilted about +8° and held at this angle (within approximately +/−0.5°), so that the detector 18 views infrared energy emitted from the thermal reference source 21 having the temperature T1. ZnSe optical elements in the front of the thermal reference source 21 focus the infrared energy onto the cold shield of the detector 18, flooding the detector 18 uniformly with an irradiance level that corresponds to the temperature and emissivity of the thermal reference source 21. Because the thermal reference source 21 is not in focus at the detector 18, small non-uniformities in the radiance of the thermal source 21 are averaged out. The angular position of the three-position minor 16 during this time period corresponds to segment 41 of the waveform of FIG. 5.

After the scanning minor 10 of the FLIR sensor reverses its direction, and as it assumes active scan, the three-position minor 16 is returned to its original 0° neutral position and held there while the external scene is viewed. The angular position of the three-position mirror 16 during this time period corresponds to segment 42 of the waveform of FIG. 5.

During the next inactive portion of the scan cycle, the three-position minor 16 is again tilted +8°, and the infrared energy from the thermal source T1 is viewed a second time. The angular position of the three-position minor 16 during this time period corresponds to segment 43 of the waveform of FIG. 5.

As the FLIR scan cycle is completed, the three-position minor 16 again returns to its 0° neutral position for the next active scan. The angular position of the three-position mirror 16 during this time period corresponds to segment 44 of the waveform of FIG. 5.

During the next full FLIR scan cycle of the scanning mirror 10, the three-position mirror 16 is sequentially moved to the −8° position as indicated by segment 45 of the waveform of FIG. 5, then to 0° position as indicated by potion 46, and then to −8° as indicated by segment 47. The thermal reference source 25 having the predetermined temperature T2 is viewed twice by the position mirror 16, during the inactive portions of the scan cycle when the three-position mirror 16 is at the −8° positions as indicated by segments 45, 47.

It can be appreciated from FIG. 5 that the movement of the three-position mirror 16 is synchronized to the movement of the scanning mirror 10. Moreover, as the scanning mirror 10 scans the external scene, the three-position mirror 16 is continuously moved from the 0°, +8°, 0°, +8°, 0°, −8°, 0°, −8°, 0° positions in synchronism with the scanning mirror 10. The positions depicted in FIG. 5 illustrate the preferred positions of the three-position mirror 16, but it should be noted that the present invention is not limited to the particular sequence of positions depicted in FIG. 5.

Since the thermal reference sources 21, 22 are relatively compact devices which can be disposed on either side of the optical path of the FLIR sensor, they can be retrofitted to an existing FLIR sensor. Furthermore, because the thermal reference sources 21, 22 are contained completely with the sensor portion of the FLIR sensor, i.e., between the FLIR scanning mirror 10 and the detector 18, the scanning mirror is not used as part of the reference system as in some prior art FLIR sensors. Accordingly, the thermal reference system of the present invention is independent of the angular travel of the scanning mirror, afocal optic characteristics, and alignment of the sensor with the afocal optics as in the prior art. Moreover, since the thermal reference sources 21, 22 are incorporated in the re-imager portion of the FLIR sensor and since they are imaged at the cold shield of the detector 18, the apparatus and method of the present invention desensitizes the thermal reference process to non-uniformities in the thermal reference sensors 21, 22. Such an arrangement also relaxes the uniformity requirements of the thermal reference sources 21, 22 from those of the prior art.

While the present invention has been described in its preferred embodiments, it is to be understood that the words used are words of description rather than of limitation, and that changes to the purview of the present claims may be made without departing from the true scope of the invention in its broader aspects.

We claim:

1. An improved forward looking infrared sensor of the type having a first moveable mirror for reflecting infrared energy of an external scene along an optical path toward an infrared detector, wherein the improvement comprises:
    a second moveable mirror, disposed in the optical path, for reflecting infrared energy onto the infrared detector;
    a first thermal reference source, disposed along one side of the optical path and viewable by the second moveable mirror, for providing thermal energy having a first predetermined temperature;
    a second thermal reference source, disposed along the opposite side of the optical path and viewable by the second moveable mirror, for providing thermal energy having a second predetermined temperature; and
    means for moving the second moveable mirror to predetermined positions such that the infrared detector selectively views the infrared energy from the external scene, the first thermal reference source, and the second thermal reference source in a predetermined order.

2. An improved forward looking infrared sensor according to claim 1 wherein said means for moving the second moveable mirror includes means for rotating the second mirror to a neutral position for viewing the external scene, for rotating the second mirror in a first direction to a first predetermined position for viewing the first thermal reference source, and for rotating the second moveable mirror in a second direction to a second predetermined position for viewing the second thermal reference source.

3. An improved forward looking infrared sensor according to claim 2 wherein the neutral position has a relative position of 0 degrees, the first predetermined position has a relative position of approximately +8 degrees and the second predetermined position has a relative position of approximately −8 degrees.

4. An improved forward looking infrared sensor according to claim 2 wherein the first and second thermal reference sources are thermo-electric devices disposed in evacuated containers having light transmissive windows.

5. An improved forward looking infrared sensor according to claim 4 which further include optical elements for focusing thermal energy onto a cold shield of the detector.

6. An improved forward looking infrared sensor according to claim 4 wherein the thermo-electric devices are coated to have an emissivity of 0.95 or greater.

7. A method for referencing a forward looking infrared sensor of the type having a first moveable mirror for scanning infrared energy from an external scene toward an infrared detector, which includes the steps of:
    reflecting infrared energy from the external scene onto the infrared detector with a second moveable mirror;
    generating infrared energy having a first predetermined reference temperature;
    generating infrared energy having a second predetermined reference temperature; and
    moving the second moveable mirror to predetermined positions such that the infrared detector selectively views the infrared energy from the external scene, the infrared energy having the first predetermined reference temperature, and the infrared energy having the second predetermined reference temperature in any predetermined order, wherein the predetermined order includes displacing the second moveable mirror to at least a neutral position when the first moveable mirror is scanning the external scene, to a first position to view the infrared energy having the first predetermined temperature when the first moveable mirror is not scanning, and to a second position to view the infrared energy having the second predetermined temperature when the first moveable mirror is not scanning.

8. A method according to claim 7 wherein the second moveable mirror moves from the neutral position, to the first predetermined position, to the neutral position, to the first predetermined position, to the neutral position, to the second predetermined position, to the neutral position and to the second predetermined position in synchronism with the scanning of the first moveable mirror.

* * * * *